US012760679B2

(12) United States Patent
Fiorini et al.

(10) Patent No.: US 12,760,679 B2
(45) Date of Patent: Oct. 13, 2026

(54) AUTOMOTIVE COOLANT LIQUID DEAERATOR UNIT

(71) Applicant: PIERBURG PUMP TECHNOLOGY GMBH, Neuss (DE)

(72) Inventors: Stefano Fiorini, Fountain Inn, SC (US); Giorgio Peroni, Leghorn (IT); Brandon Woltz, Fountain Inn, SC (US); Eric Trombley, Fountain Inn, SC (US); Gabriella Ford, Fountain Inn, SC (US)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 320 days.

(21) Appl. No.: 18/293,364

(22) PCT Filed: Aug. 3, 2021

(86) PCT No.: PCT/EP2021/071663

§ 371 (c)(1),
(2) Date: Jan. 30, 2024

(87) PCT Pub. No.: WO2023/011706

PCT Pub. Date: Feb. 9, 2023

(65) Prior Publication Data

US 2024/0337211 A1 Oct. 10, 2024

(51) Int. Cl.
*F01P 11/02* (2006.01)
*B01D 19/00* (2006.01)

(52) U.S. Cl.
CPC ............ *F01P 11/028* (2013.01); *B01D 19/00* (2013.01); *F01P 11/029* (2013.01)

(58) Field of Classification Search
CPC ............................... B01D 19/00; F01P 11/028
See application file for complete search history.

(56) References Cited

U.S. PATENT DOCUMENTS

| | | | |
|---|---|---|---|
| 2019/0170053 | A1 | 6/2019 | Mark et al. |
| 2020/0009939 | A1 | 1/2020 | Potticary et al. |

FOREIGN PATENT DOCUMENTS

| | | | | |
|---|---|---|---|---|
| DE | 38 13 654 | A1 | 11/1989 | |
| DE | 10 2010 008 656 | A1 | 8/2011 | |
| FR | 3016923 | A3 * | 7/2015 | ............ F01P 11/029 |
| GB | 2117662 | A * | 10/1983 | ......... B01D 19/0036 |

* cited by examiner

*Primary Examiner* — Robert A Hopkins
(74) *Attorney, Agent, or Firm* — Norman B. Thot

(57) ABSTRACT

A passive automotive coolant liquid deaerator unit for deaerating a circulating coolant liquid of a coolant circuit of an automobile. The passive automotive coolant liquid deaerator unit includes a deaerator housing which defines a first deceleration chamber. The first deceleration chamber has a chamber liquid inlet, a chamber liquid outlet, and a deaeration opening which is arranged at a vertical top of the first deceleration chamber. A fluidic cross section of the first deceleration chamber is arranged to continuously increase between the chamber liquid inlet and the chamber liquid outlet.

12 Claims, 2 Drawing Sheets

AUTOMOTIVE COOLANT LIQUID DEAERATOR UNIT

CROSS REFERENCE TO PRIOR APPLICATIONS

This application is a U.S. National Phase application under 35 U.S.C. § 371 of International Application No. PCT/EP2021/071663, filed on Aug. 3, 2021. The International Application was published in English on Feb. 9, 2023 as WO 2023/011706 A1 under PCT Article 21(2).

FIELD

The present invention relates to a passive automobile coolant liquid deaerator unit for deaerating a circulating coolant liquid of a coolant circuit of an automobile.

BACKGROUND

Typical coolant liquid circuits in automotive applications are engine coolant circuits for an electrical traction engine or for an internal combustion traction engine, or can be traction battery coolant circuits or coolant circuits for secondary devices, for example, for turbochargers, for exhaust gas valves etc. An automotive coolant liquid circuit typically comprises a mechanical or an electric coolant liquid pump which circulates the coolant liquid in the coolant circuit. A typical type of coolant liquid pump is a flow pump.

The cooling capacity of the coolant liquid and the pumping rate of a flow pump are substantially deteriorated by gas/air bubbles carried with the coolant liquid current. The prior art has described an expansion tank at the vertically highest point of the coolant circuit so that the air bubbles can rise up to the expansion tank. When the coolant liquid pump is active and the coolant liquid is circulated in the coolant circuit, however, the air bubbles are carried with the circulating coolant liquid current so that the air bubbles can substantially remain within the circulating coolant liquid current and do not rise to the expansion tank. This effect is even stronger and worse the higher the flow velocity of the coolant liquid in the coolant liquid circuit is.

DE 10 2010 008 656 A1 describes an air bubble separator which is provided in-line with a usual coolant liquid tube of the circuit. The air separation device causes turbulence in the relatively fast-flowing coolant liquid current so that the air bubble separator is not very effective.

SUMMARY

An aspect of the present invention is to provide an effective passive automotive coolant liquid deaerator device.

In an embodiment, the present invention provides a passive automotive coolant liquid deaerator unit for deaerating a circulating coolant liquid of a coolant circuit of an automobile. The passive automotive coolant liquid deaerator unit includes a deaerator housing which defines a first deceleration chamber. The first deceleration chamber comprises a chamber liquid inlet, a chamber liquid outlet, and a deaeration opening which is arranged at a vertical top of the first deceleration chamber. A fluidic cross section of the first deceleration chamber is arranged to continuously increase between the chamber liquid inlet and the chamber liquid outlet.

BRIEF DESCRIPTION OF THE DRAWINGS

The present invention is described in greater detail below on the basis of embodiments and of the drawings in which.

DETAILED DESCRIPTION

Figure 1:
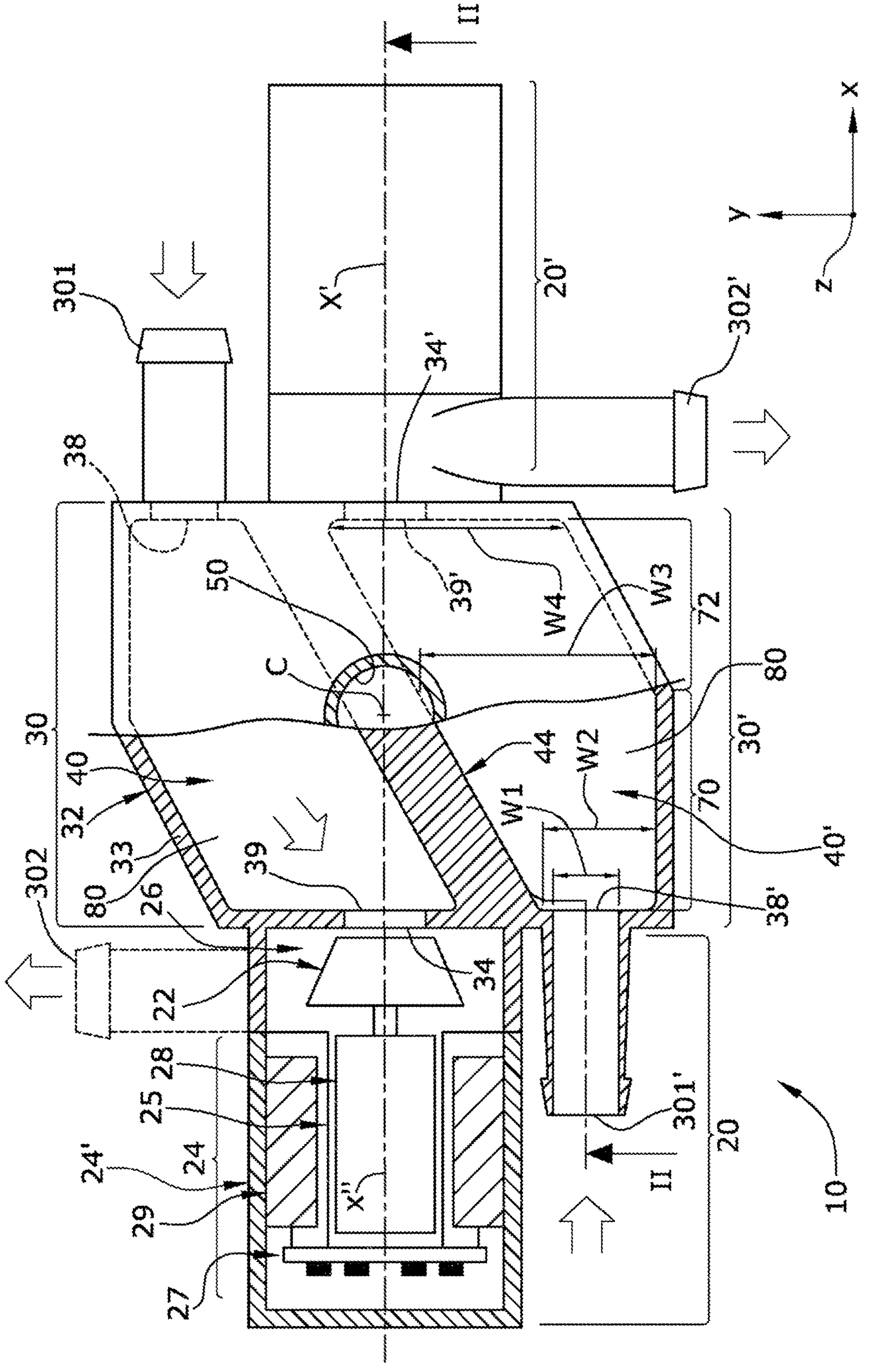
FIG. 1 shows a combined top view and a horizontal longitudinal section I-I of an integrated automotive electric liquid pump module comprising a twin coolant liquid deaerator unit according to the present invention.

The passive automotive coolant liquid deaerator unit according to the present invention is provided with a deaerator housing which defines a widening deceleration chamber with a chamber liquid inlet and a chamber liquid outlet. The deaerator housing is provided with a deaeration opening at the vertical top of the deceleration chamber. The fluidic cross-section of the deceleration chamber continuously increases at least in a zone between the chamber liquid inlet and the chamber liquid outlet so that the flow velocity of the coolant liquid current within the deceleration chamber is continuously and substantially reduced.

The deaeration opening can be fluidically connected to the atmosphere or to an expansion tank. A semipermeable membrane can be provided between the deaeration opening and the atmosphere or the expansion tank, the semipermeable membrane not being permeable for the coolant liquid, but permeable for air.

The coolant liquid flow velocity reduction has the effect that the pressure of the coolant liquid and of the gas bubbles is reduced so that the gas bubbles expand and become lighter in specific weight, thereby increasing the hydrostatic uplift force of the air bubbles. Since the coolant liquid flow velocity is significantly reduced in the deceleration chamber, a relatively short deceleration chamber, as seen in a flow direction, is sufficient to provide the gas bubbles enough time to rise up to the surface of the coolant liquid within the deceleration chamber. Since the fluidic cross-section of the deceleration chamber continuously increases, and does not only increase stepwise, massive turbulence within the deceleration chamber is avoided so that the rise of the air bubbles to the coolant liquid surface is not disturbed.

At least 50% of the total cross-sectional increase between the chamber liquid inlet and the chamber liquid outlet is provided by the continuously cross-sectional increasing section of the deceleration chamber. It is not necessary to avoid any kind of a stepwise cross-sectional increase, however, the non-continuous share should be as small as possible, for example, below 25% of the total cross-sectional increase between the inlet and the outlet.

The coolant liquid deaerator unit with the, at least in part, continuously cross-sectional increasing deceleration chamber provides a very effective degassing or deaeration of the coolant liquid current with separation rates of substantially more than 35%, and even higher, over the complete spectrum of possible general coolant flow rates in the coolant liquid circuit.

The present invention can generally also be used in nonautomotive applications, for example, in a static electronics cooling circuit.

The deceleration chamber can, for example, have a cross-section widening zone with a continuous increase of the horizontal width from an initial horizontal width to an end width, which increase can, for example, be a linear increase.

The continuous increase share is more than 50% of the total cross-sectional increase of the complete deceleration chamber, and is realized by an increasing horizontal width of the deceleration chamber, but not by a declining bottom wall of the deceleration chamber.

The bottom wall between the chamber liquid inlet and the chamber liquid outlet of the deceleration chamber can, for example, lie substantially in a horizontal plane. Since the deceleration chamber bottom wall is, as seen in the flow direction, not substantially declining, the liquid current flow within the deceleration chamber has no substantial downward component which could also cause the gas bubbles to have a downward flow direction component which would hinder the gas bubbles to rise to the coolant liquid surface.

The cross section widening zone can, for example, begin right after the chamber liquid inlet, whereas a constant cross-section zone could be provided downstream of the cross-section widening zone. Since the cross-section widening zone could cause some liquid turbulence, the coolant liquid current is calmed after the cross-section widening zone so that the rise of the gas bubbles is substantially improved.

The chamber liquid inlet can, for example, be provided vertically higher than the chamber liquid outlet. The lowest edge of the opening of the chamber liquid inlet can, for example, be vertically higher than the highest edge of the opening of the chamber liquid outlet. The vertical chamber wall above the chamber liquid outlet opening is a kind of baffle plate for the gas bubbles so that the gas bubbles hitting the vertical chamber wall simply rise vertically along the vertical chamber opening wall up to the liquid surface.

The coolant liquid deaerator unit can, for example, be a twin deaerator and the deaerator housing can, for example, define a widened second deceleration chamber. The second widened deceleration chamber is substantially separated from the first deceleration chamber so that the two different coolant liquid flows flowing through the two deceleration chambers are substantially separated from each other and do not substantially mix with each other. The deaerator housing according to this aspect of the present invention therefore integrates two deaerator units for two separate cooling liquid circuits.

The deaerator housing can, for example, be provided with a separation wall which directly separates the first deceleration chamber from the second deceleration chamber. The separation wall does not, however, necessarily completely fluidically separate the two deceleration chambers, but separates the lower liquid-containing parts of both deceleration chambers from each other so that the liquids of both cooling liquid circuits are not mixed.

The deaerator unit can, for example, be provided with a single gas outlet opening for both deceleration chambers so that the twin deaerator has only one single gas outlet opening.

The housing main body of the deaerator housing can, for example, define an axial liquid pump inlet opening axially which is aligned with the center of a flow pump wheel of a mechanical or an electrical coolant liquid pump. The axial liquid pump inlet opening is axially adjacent to the flow pump wheel. The flow pump wheel can, for example, be an impeller wheel and the deaerator housing main body can, for example, define an outlet ring channel, for example, a volute-like ring channel which radially surrounds the flow pump wheel. The deaerator housing main body can, for example, be a plastic body which defines in one integral piece at least four or five side walls of the deceleration chamber and also substantially defines the pump's outlet ring channel so that a separate (plastic) piece for defining the outlet ring channel can be avoided.

The largest cross-section within the deceleration chamber as seen in the general flow direction can, for example, be at least 80% larger, for example, more than 120% larger, than the cross section of the liquid inlet opening.

The deaerator housing which defines the deceleration chamber, the deaerator liquid inlet opening, and the deaerator liquid outlet opening, can, for example, be mechanically directly and stiffly connected to the liquid pump unit and can in particular be directly connected to a housing part of the liquid pump unit.

In other words, the flow pump unit and the passive deaerator unit are combined in one single integrated deaerator-pump-module. The fluidic properties of the flow pump unit and of the deaerator unit can be perfectly harmonized because the pump unit and the deaerator unit are fluidically directly connected to each other. Compared to a deaerator unit provided separately and remote from the pump unit, a separate connection tube and connection device to connect the two units are avoided so that the number of fluidic interfaces of the coolant liquid circuit is reduced.

The deaerator unit can, for example, be positioned fluidically upstream of the electric flow pump unit so that a relatively air-bubble-free coolant liquid current enters the flow pump unit, the fluidic efficiency of the flow pump unit is not deteriorated, and the flow pump unit always works efficiently.

An embodiment of the present invention is described below with reference to the enclosed drawings.

Figure 2:
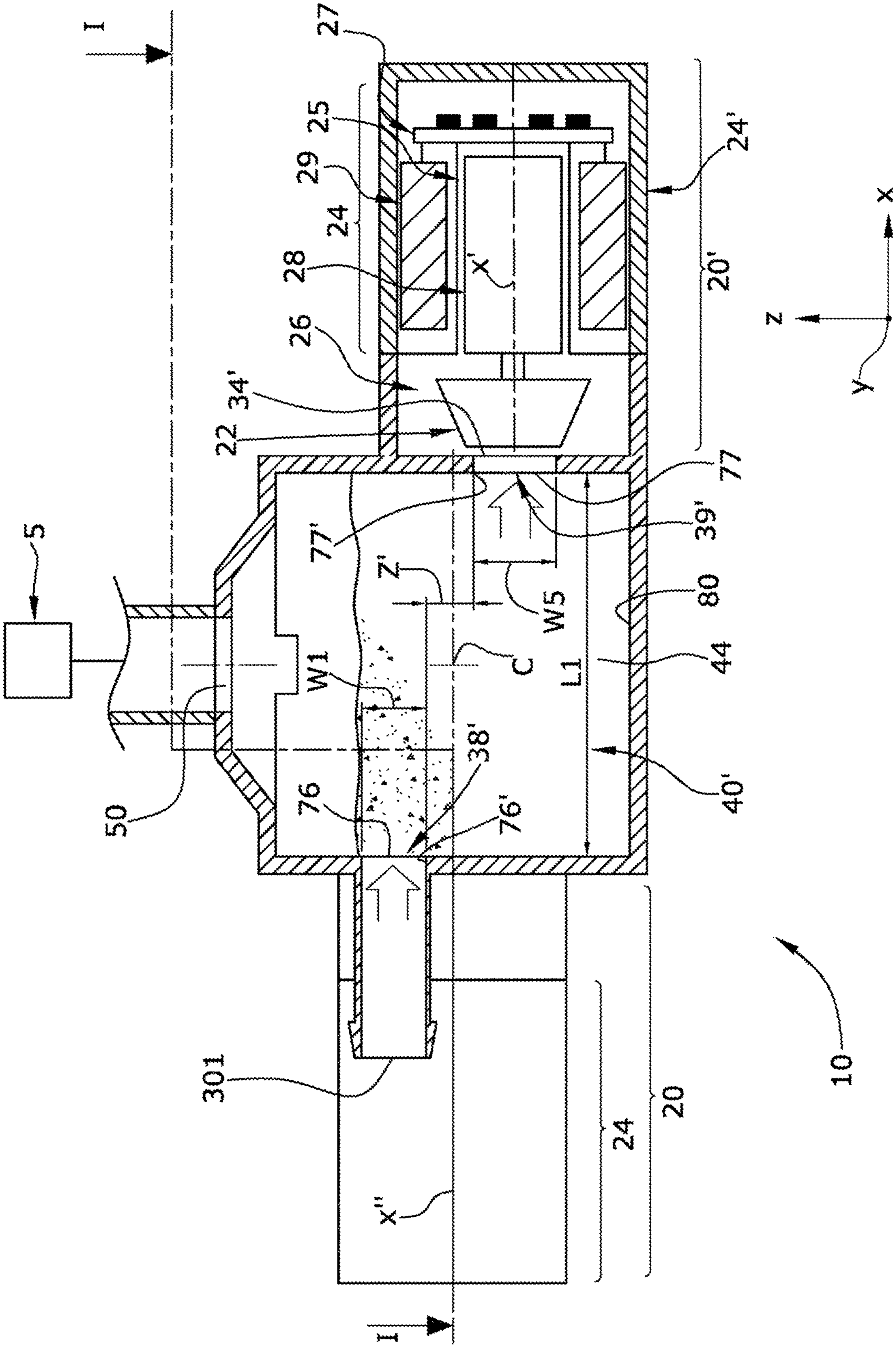
FIG. 2 shows a combined side of view and a vertical longitudinal section II-II of the pump module including the twin coolant liquid deaerator of FIG. 1.

FIGS. 1 and 2 show an automotive electric liquid pump module 10 integrating two combined deaerator/pump combinations. The pump module 10 is used in an automotive application so that that low weight, very low production costs, high reliability, high vibration durability, and compactness are general requirements for the pump module 10. The pump module 10 is a twin module integrating two combined flow pump unit/deaerator unit combinations in one single pump module 10. The pump module 10 can circulate a coolant liquid in two different coolant circuits, for example, an automotive traction engine cooling circuit and a traction battery cooling circuit.

FIG. 1 shows a top view of two different horizontal planes XY and FIG. 2 shows a side view of different vertical planes XZ of the pump module 10. The pump module 10 comprises a first electrical flow pump unit 20, a fluidically related first passive deaerator unit 30, a second electrical flow pump unit 20', and a fluidically related second passive deaerator unit 30'. From a structural perspective, the first deaerator unit 30 and the second deaerator unit 30' are defined by one single plastic deaerator housing 32 made of a suitable plastic deaerator housing main body 33 and a suitable cover body so that the pump module 10 is substantially an assembly of two separate electrical flow pump units 20, 20' and the complete deaerator housing 32.

The two separate electrical flow pump units 20, 20' both have an identical structure, but can alternatively generally be different in their electric and hydraulic performance. In this embodiment, the electrical flow pump units 20, 20' are each provided with an electric can motor 24 with a separation can 25 separating a wet motor section from a dry motor section. The motor electronics 27 and an electromagnetic motor stator 29 are provided in the dry section, whereas a permanently magnetized motor rotor 28 and a flow pump rotor 22 are provided in the wet section. The motor rotor 28 directly and coaxially drives the flow pump rotor 22 which is provided as an impeller with an axial pump wheel inlet and a radial pump wheel outlet.

The deaerator housing 32 defines a first widened deceleration chamber 40 and a second identical deceleration chamber 40'. The two deceleration chambers 40, 40' do not, however, necessarily need to be identical if the two connected cooling circuits and their cooling performance are not equal.

The cross section area of the deceleration chambers 40, 40' dramatically widens after the corresponding chamber liquid inlet 38, 38' by more than 200% in relation to the cross section area of the opening of the corresponding chamber liquid inlet 38, 38' so that the liquid entering the deceleration chamber 40, 40' is dramatically decelerated and flows relatively slowly from the chamber liquid inlet 38, 38' to the corresponding chamber liquid outlet 39, 39'.

As shown in FIG. 1, the deceleration chamber 40, 40' has, right after the opening 76 of the chamber liquid inlet 38, 38', a cross section widening zone 70 with an initial horizontal width W2 which is linearly increasing to an end width W3. Downstream of and directly following the cross-section widening zone 70 is a constant cross-section zone 72 with a constant horizontal width W3, W4. The opening 76 of the chamber liquid inlet 38, 38' has a chamber liquid opening width W1 which is a diameter and which is about 60% of the initial horizontal width W2. The horizontal end width is about 200% of the initial horizontal width W2.

As can be seen in FIG. 2, the bottom wall 80 of the deceleration chambers 40, 40' is completely plane and lies in a horizontal plane XY. The chamber liquid inlet 38, 38' is located vertically higher than the corresponding chamber liquid outlet 39, 39'. The lowest edge 76' of the chamber liquid inlet opening 76 is provided vertically higher with a vertical offset Z' than the highest edge 77' of the chamber liquid outlet opening 77 which has a height W5.

The gas/air bubbles entering the deceleration chamber 40, 40' together with the coolant liquid therefore have significant time to rise to the top region of the deceleration chamber 40, 40', as shown in FIG. 2. The two deceleration chambers 40, 40' are substantially separated from each other by a separation wall 44 so that none of the coolant liquids of the two deceleration chambers mix with each other.

Both deaerator units 30, 30' together have one single common deaeration opening 50 at the vertical top of the two deceleration chambers 40, 40' so that the deceleration chambers 40, 40' are fluidically connected with each other and have the same fluid pressures. Each deaerator unit 30, 30' can alternatively have its own deaeration opening 50 to fluidically completely separate both cooling circuits from each other. The deaeration opening 50 is fluidically connected to a compensation tank 5.

The since the deaerator unit 30, 30' is positioned fluidically upstream of the corresponding electrical flow pump unit 20, 20', the deaerator unit chamber liquid outlet 39, 39' defines the axial liquid pump inlet opening 34, 34', respectively, so that a deaerated liquid current axially enters the corresponding electrical pump unit 20, 20'. As can be seen in both drawings, the deaerator housing main body 33 substantially defines the outer circumference wall of the outlet ring channel 26 radially surrounding the corresponding flow pump rotor 22, and also defines the corresponding tangential pump outlet duct with the corresponding pump outlet opening 302, 302'. The deaerator housing main body 33 also defines both inlet ducts 301, 301' respectively leading to the deaerator unit chamber liquid inlets 38, 38'. The deaerator housing main body 33 is directly connected to the motor housing 24'.

As shown in both drawings, the rotational axis' X", X' of both electrical flow pump units 20, 20' are provided perfectly coaxially with each other. The rotational axis' X", X' of both electrical flow pump units 20, 20' also intersect perfectly with the center of gravity C of the complete pump module 10.

The present invention is not limited to embodiments described herein; reference should be had to the appended claims.

LIST OF REFERENCE NUMERALS

5 Compensation tank
10 Automotive electric liquid pump module/Pump module
20 First electrical flow pump unit
20' Second electrical flow pump unit
22 Flow pump rotor
24 Electric can motor
24' Motor housing
25 Separation can
26 Outlet ring channel
27 Motor electronics
28 Motor rotor
29 Electromagnetic motor stator
30 First passive deaerator unit
30' Second passive deaerator unit
32 Deaerator housing
33 Deaerator housing main body
34 Axial liquid pump inlet opening
34' Axial liquid pump inlet opening
38 Chamber liquid inlet
38' Chamber liquid inlet
39 Chamber liquid outlet
39' Chamber liquid outlet
40 First deceleration chamber
40' Second deceleration chamber
44 Separation wall
50 Deaeration opening
70 Cross-section widening zone
72 Constant cross-section zone
76 Opening (of the chamber liquid inlet)
76' Lowest edge (of the opening of the chamber liquid inlet)
77 Chamber liquid outlet opening
77 Highest edge (of chamber liquid outlet opening)
80 Bottom wall
301 Inlet duct
301' Inlet duct
302 Pump outlet opening
302' Pump outlet opening
C Center of gravity
L1 Deceleration chamber length
W1 Chamber liquid opening width (of chamber liquid inlet)
W2 Initial horizontal width W2
W3 End width
W4 Horizontal width
W5 Height of chamber liquid outlet opening
X' Rotational axis
X" Rotational axis
Z' Vertical offset

What is claimed is:

1. A passive automotive coolant liquid deaerator unit for deaerating a circulating coolant liquid of a coolant circuit of an automobile, the passive automotive coolant liquid deaerator unit comprising:

a deaerator housing which defines a first deceleration chamber, the first deceleration chamber comprising a chamber liquid inlet, a chamber liquid outlet, and a deaeration opening which is arranged at a vertical top of the first deceleration chamber, wherein, a fluidic cross section of the first deceleration chamber is arranged to continuously increase between the chamber liquid inlet and the chamber liquid outlet.

2. The passive automotive coolant liquid deaerator unit as recited in claim 1, wherein, the first deceleration chamber further comprises a cross-section widening zone, and the cross-section widening zone has a horizontal width which is arranged to continually increase from an initial width to an end width.

3. The passive automotive coolant liquid deaerator unit as recited in claim 2, wherein the continual increase of the horizontal width of the cross-section widening zone from the initial width to the end width is linear.

4. The passive automotive coolant liquid deaerator unit as recited in claim 2, wherein the cross-section widening zone is arranged to begin directly after the chamber liquid inlet.

5. The passive automotive coolant liquid deaerator unit as recited in claim 1, wherein the chamber liquid inlet is arranged vertically higher than the chamber liquid outlet.

6. The passive automotive coolant liquid deaerator unit as recited in claim 5, wherein, the chamber liquid inlet has an opening which has a lowest edge, the chamber liquid outlet has an opening which has a highest edge, and the lowest edge of the opening of the chamber liquid inlet is arranged to be vertically higher than the highest edge of the opening of the chamber liquid outlet.

7. The passive automotive coolant liquid deaerator unit as recited in claim 1, wherein, the first deceleration chamber further comprises a bottom wall which is arranged between the chamber liquid inlet and the chamber liquid outlet, and the bottom wall is arranged to lie substantially in a horizontal plane.

8. The passive automotive coolant liquid deaerator unit as recited in claim 1, wherein the deaerator housing further defines a second deceleration chamber which is arranged to be substantially separate from the first deceleration chamber.

9. The passive automotive coolant liquid deaerator unit as recited in claim 8, wherein the deaeration opening is provided for both the first deceleration chamber and the second deceleration chamber.

10. The passive automotive coolant liquid deaerator unit as recited in claim 8, wherein the deaerator housing comprises a separation wall which is arranged to directly separate the first deceleration chamber from the second deceleration chamber.

11. The passive automotive coolant liquid deaerator unit as recited in claim 10, wherein the deaeration opening is provided for both the first deceleration chamber and the second deceleration chamber.

12. The passive automotive coolant liquid deaerator unit as recited in claim 1, wherein, the deaerator housing comprises a deaerator housing body, and the deaerator housing body defines an outlet ring channel for a flow pump wheel of an electrical flow pump unit which is adjacently mountable to the passive automotive coolant liquid deaerator unit.

* * * * *